(12) United States Patent
Ji et al.

(10) Patent No.: US 11,341,370 B2
(45) Date of Patent: May 24, 2022

(54) CLASSIFYING IMAGES IN OVERLAPPING GROUPS OF IMAGES USING CONVOLUTIONAL NEURAL NETWORKS

(71) Applicant: International Business Machines Corporation, Armonk, NY (US)

(72) Inventors: Peng Ji, Shanghai (CN); Guo Qiang Hu, Shanghai (CN); Yuan Yuan Ding, Shanghai (CN); Jun Zhu, Shanghai (CN); Jing Chang Huang, Shanghai (CN); Sheng Nan Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 16/692,356

(22) Filed: Nov. 22, 2019

(65) Prior Publication Data

US 2021/0158094 A1 May 27, 2021

(51) Int. Cl.
*G06K 9/62* (2022.01)
*G06Q 50/04* (2012.01)
*G06N 3/08* (2006.01)
*G06N 3/04* (2006.01)

(52) U.S. Cl.
CPC ......... *G06K 9/6257* (2013.01); *G06K 9/628* (2013.01); *G06K 9/6215* (2013.01); *G06K 9/6232* (2013.01); *G06N 3/04* (2013.01); *G06N 3/08* (2013.01); *G06Q 50/04* (2013.01)

(58) Field of Classification Search
CPC .. G06K 9/6257; G06K 9/6215; G06K 9/6232; G06K 9/628; G06N 3/04; G06N 3/08; G06Q 50/04
See application file for complete search history.

(56) References Cited

U.S. PATENT DOCUMENTS

| 10,152,525 B2 | 12/2018 | Sen et al. | |
| 2003/0110181 A1* | 6/2003 | Schuetze | G06F 16/358 |
| 2010/0135533 A1* | 6/2010 | Kanda | G06K 9/6269 |
| | | | 382/106 |
| 2011/0035705 A1* | 2/2011 | Faenger | G06F 16/4387 |
| | | | 715/810 |

(Continued)

OTHER PUBLICATIONS

"UNN: A Neural Network for Uncertain Data Classification," Conference Paper, PAKDD 2010, LNCS, vol. 6118.

*Primary Examiner* — Qun Shen
(74) *Attorney, Agent, or Firm* — Patterson + Sheridan, LLP (57) ABSTRACT

The present disclosure relates to training a machine learning model to classify images. An example method generally includes receiving a training data set including images in a first category and images in a second category. A convolutional neural network (CNN) is trained using the training data set, and a feature map is generated from layers of the CNN based on features of images in the training data set. A first area in the feature map including images in the first category and a second area in the feature map where images in the first category overlap with images in the second category are identified. The first category is split into a first subcategory corresponding to the first area and a second subcategory corresponding to the second area. The CNN is retrained based on the images in the first subcategory, images in the second subcategory, and images in the second category.

18 Claims, 5 Drawing Sheets

(56) References Cited

U.S. PATENT DOCUMENTS

| | | | |
|---|---|---|---|
| 2012/0184845 A1* | 7/2012 | Ishikawa | A61B 3/102 |
| | | | 600/425 |
| 2016/0117587 A1 | 4/2016 | Yan et al. | |
| 2017/0124415 A1* | 5/2017 | Choi | G06K 9/628 |
| 2019/0080450 A1* | 3/2019 | Arar | G06T 7/194 |
| 2019/0147621 A1* | 5/2019 | Alesiani | G06T 7/73 |
| | | | 382/190 |
| 2020/0143205 A1* | 5/2020 | Yao | G06V 10/82 |
| 2020/0160975 A1* | 5/2020 | Yao | G06T 5/002 |
| 2021/0133474 A1* | 5/2021 | Sawada | G06K 9/3233 |

* cited by examiner

CLASSIFYING IMAGES IN OVERLAPPING GROUPS OF IMAGES USING CONVOLUTIONAL NEURAL NETWORKS

BACKGROUND

The present disclosure relates to image classification, and more specifically, to classifying images in overlapping groups of images.

Image recognition is a task that may be performed in various environments. For example, in industrial environments, image recognition may be used to identify anomalies in manufactured goods. For any given item being manufactured, anomalies may range from minor anomalies that do not substantially affect the functionality of the item (e.g., are cosmetic or other minor manufacturing errors) to major anomalies that render the item unusable or unsellable (e.g., stuck pixels on an LCD panel, malformed memory cells on solid state storage, malformed logical units on a processor, etc.).

Because of the variety of anomalies that may be generated during the manufacturing of various goods, anomalies may further be classified into categories that define specific types of anomalies. Generally, images representing a specific type of anomaly may have similar appearances, and machine learning models such as convolutional neural networks may be trained to recognize these types of anomalies. However, in some cases, images representing a specific type of anomaly may have a distribution such that some of the images representing that specific type of anomaly actually have an appearance similar to images representing a different type of anomaly.

Further, anomalies may arise during the manufacturing process at different rates. Some anomalies may be relatively common, while other anomalies may be less common. A training data set that includes anomalies that are detected over an amount of time may, thus, include a large number of images that correspond to relatively common anomalies and a significantly smaller number of images that correspond to less common anomalies. Further, the number of images of an anomaly that appears similar to other anomalies may be relatively small. Training a machine learning model, such as a convolutional neural network, based on such a training data set may result in poor performance, as the model may have insufficient training data for recognizing less common anomalies or anomalies that appear to be similar to other classes of anomalies.

SUMMARY

One embodiment disclosed herein includes a method for training a machine learning model. The method generally includes receiving a training data set including images in a first category and images in a second category. A convolutional neural network (CNN) is trained using the received training data set. A feature map is generated from one or more layers of the CNN based on one or more features of images in the training data set. A first area in the feature map is identified, where the first area includes images in the first category, and a second area in the feature map is identified, where images in the first category overlap with images in the second category. Based on the identified first and second areas, the first category of images is split into a first subcategory corresponding to the first area in the feature map and a second subcategory corresponding to the second area in the feature map. The CNN is retrained based on images in the first subcategory, images in the second subcategory, and images in the second category.

Another embodiment includes a processor and a memory having instructions stored thereon which, when executed on the processor, performs an operation for training a machine learning model. The operation generally includes receiving a training data set including images in a first category and images in a second category. A convolutional neural network (CNN) is trained using the received training data set. A feature map is generated from one or more layers of the CNN based on one or more features of images in the training data set. A first area in the feature map is identified, where the first area includes images in the first category, and a second area in the feature map is identified, where images in the first category overlap with images in the second category. Based on the identified first and second areas, the first category of images is split into a first subcategory corresponding to the first area in the feature map and a second subcategory corresponding to the second area in the feature map. The CNN is retrained based on images in the first subcategory, images in the second subcategory, and images in the second category.

Still another embodiment includes a computer-readable storage medium having instructions stored thereon, which, when executed on a processor, performs an operation for training a machine learning model. The operation generally includes receiving a training data set including images in a first category and images in a second category. A convolutional neural network (CNN) is trained using the received training data set. A feature map is generated from one or more layers of the CNN based on one or more features of images in the training data set. A first area in the feature map is identified, where the first area includes images in the first category, and a second area in the feature map is identified, where images in the first category overlap with images in the second category. Based on the identified first and second areas, the first category of images is split into a first subcategory corresponding to the first area in the feature map and a second subcategory corresponding to the second area in the feature map. The CNN is retrained based on images in the first subcategory, images in the second subcategory, and images in the second category.

DETAILED DESCRIPTION

Embodiments presented herein describe techniques for training a machine learning model to classify images based on training data sets of images in a first category of images that potentially includes images that are similar to those in a second category of images. Generally, an initial model may be trained using a training data set of pre-classified images. After training the initial model, a feature may be extracted from a layer of the initial model, and a feature map may be generated based on the extracted feature to identify clusters in the feature map that different types of images belong to. If the feature map results in a clustering for a first class of images that includes some overlap with a clustering for a second class of images, the first class of images may be split into a first subclass of the non-overlapping images and a second subclass of the overlapping images, and the model may be retrained using the first subclass of images, the second subclass of images, and the second class of images.

By using feature maps and identification of overlapping clusters in a feature map to retrain a machine learning model, embodiments presented herein may generate machine learning models that can accurately classify images received for analysis. For images that include features that are common to a plurality of categories, a machine learning model trained using feature maps and identification of overlapping clusters in a feature map may classify such images into an internal category that maps to a user-defined category. Instead of classifying an image based on a coarser categorization that may result in the incorrect classification of an image, embodiments presented herein may classify an image into the correct user-defined category based on classifications of images into smaller sub-categories.

Figure 1:
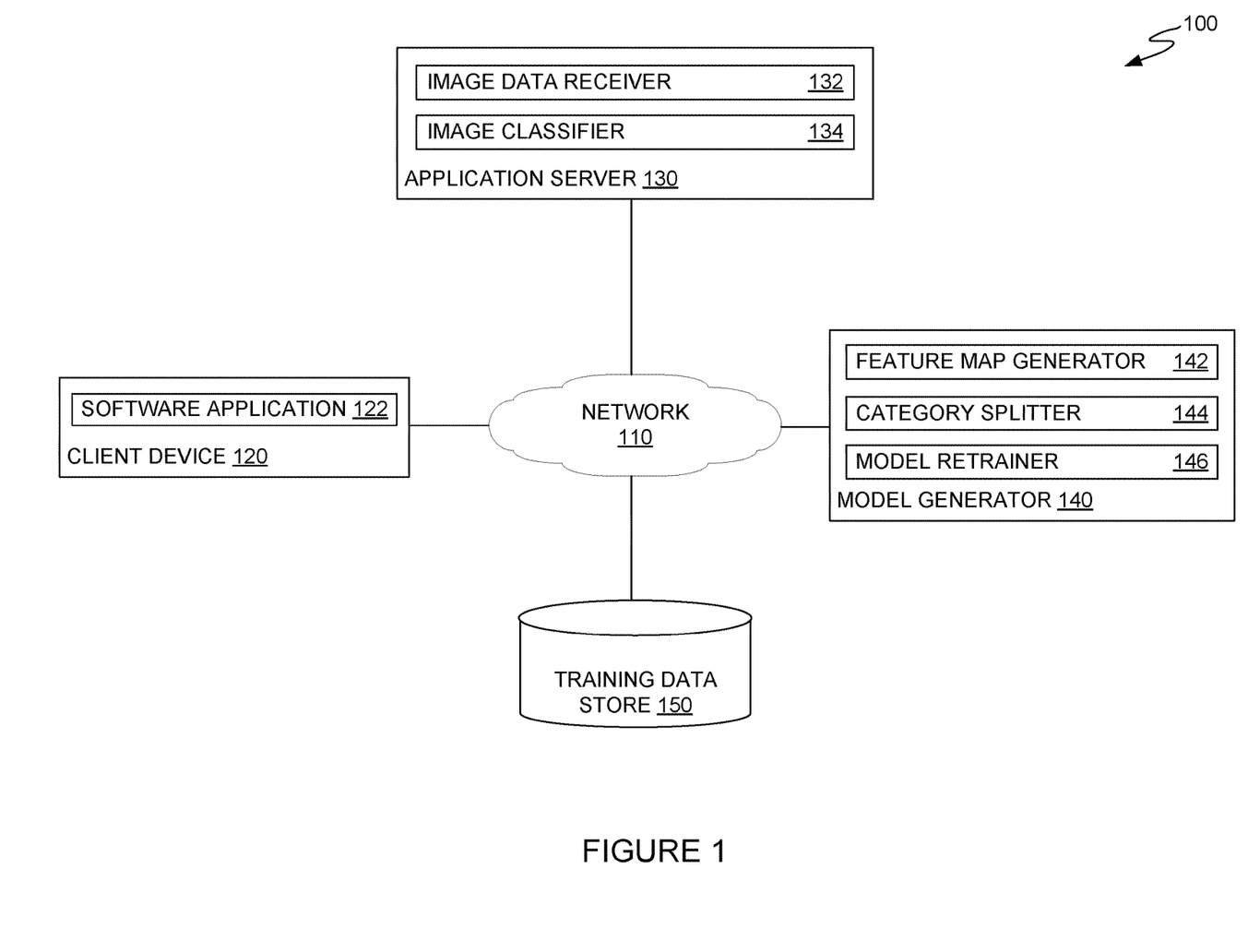
FIG. 1 illustrates an example networked environment in which a machine learning model is trained using image data from a first category of images that overlaps with image data from a second category of images, according to one embodiment.

FIG. 1 illustrates an example networked computing environment in which a machine learning model training system trains a model for classifying images based on a training data set of images in a first category of images that potentially includes images that are similar to those in a second category of images, according to an embodiment of the present disclosure. As illustrated, computing environment 100 includes a client device 120, an application server 130, a model generator 140, and a training data store 150.

Client device 120 generally is representative of a computing device on which a user can initiate a request to classify an image or set of images by an application executing on application server 130. Client device 120 may be, for example, a laptop computer, a desktop computer, a thin client, a tablet computer, a mobile computing device, and the like. As illustrated, client device 120 includes a user interface 122. User interface 122 allows a user of client device 120 to interact with an application that uses a machine learning model generated by model generator 140. In some embodiments, user interface 122 may display a text editing interface or other graphical interface that allows a user to specify images to classify using application server 130 and may expose a file upload mechanism or other batch data processing mechanisms for uploading images to application server 130 for analysis.

While client device 120 as illustrated includes a user interface through which a user can specify images to be classified using application server 130, it should be recognized that client device 120 need not include a user interface to interact with application server 130. For example, various Internet of Things (IoT) or other connected devices, such as industrial robots, process control systems, or the like may be connected to application server 130 to upload images, in real time, for analysis.

In some embodiments, client device 120 may take one or more actions based on the classification of an image received from application server 130. For example, in a manufacturing or quality control system, client device 120 may use the classification of images to determine whether to allow a manufactured item to proceed to the next manufacturing step, send the manufactured item to a remediation step, or discard the manufactured item. In another example, in a semiconductor manufacturing example, client device 120 can designate dies fabricated on a semiconductor wafer for different bins of products, such as processors with different performance characteristics, based on the classification of images captured for each die on the semiconductor wafer. It should be recognized, however, that a variety of actions may be taken by client device 120 based on the classification of images based on the specific environment in which client device 120 is deployed.

Application server 130 generally receives and processes requests to classify images received from a client device 120 based on a machine learning model trained by model generator 140. As illustrated, application server 130 includes an image data receiver 132 and an image classifier 134. While application server 130 is illustrated as including image data receiver 132 and image classifier 134, it should be recognized that these components need not reside on the same system.

Image data receiver 132 generally provides an image upload interface through which images are received from client device 120. Generally, image data receiver 132 may be configured to receive images from a client device 120 in various file formats, such as the Joint Photographic Experts Group (JPEG) format, Tagged Image File Format (TIFF), Portable Network Graphics (PNG) format, or other image file formats. In some embodiments, image data receiver 132 may be configured to receive images in one or more supported file formats and convert the received images into a file format usable by image classifier 134 for classifying the received images. In some embodiments, image data receiver 132 may be configured to resize received images into a standard resolution prior to passing the received images to image classifier 134 for analysis. In some embodiments, image data receiver 132 may be configured to perform other postprocessing operations on the received images to improve the quality of the received images. These operations may include, for example, noise reduction, exposure compensation, sharpening, and other post-processing operations that may improve the quality of the received images. In some embodiments, image data receiver 132 may additionally determine whether an image is of sufficient quality to proceed with classification and may reject an image and/or request a replacement image if image data receiver 132 determines that the image is of insufficient quality to proceed with classification.

Image classifier 134 generally uses a machine learning model, such as a convolutional neural network (CNN), to classify images into a category. As discussed in further detail below, the machine learning model used by image classifier 134 may be trained using sub-categories of images in a user-defined category such that the machine learning model classifies a received image as one of the sub-categories of images. Generally, image classifier 134 may receive, from model generator 140, a definition of a machine learning model trained using a plurality of internal categories, which may include sub-categories of images in a user-defined category, and a mapping of each of the plurality of internal categories in the machine learning model to a user-defined category of images in a training data set used to initially train the machine learning model.

When image classifier 134 receives an image for analysis from a client device 120 through image data receiver 132, image classifier 134 may classify the image into one of the internal categories in the machine learning model. After classifying the image into one of the internal categories, image classifier 134 can examine the mapping of the internal categories to user-defined categories to identify that user-defined category that an image is to be classified in. Image classifier 134 can return the user-defined category to client device 120 as the classification of the received image based on the mapping of the internal categories to the user-defined categories.

Model generator 140 generally trains a machine learning model to classify images based on a training data set of images from training data stores 150. Generally, model generator 140 uses supervised learning techniques to train a machine learning model, and each image in a training data set used to train the machine learning model may be tagged or otherwise associated with a user-defined category. The machine learning model generated by model generator 140 may, for example, be a convolutional neural network, which is a neural network that includes a plurality of convolutional layers that assigns weights to different features in an input image and classifies the input image based on the assigned weights in each of the layers. However, it should be recognized that model generator 140 may be configured to train other types of machine learning models that may be used in image recognition, such as other deep neural networks, Bayes classifiers, decision trees, or other machine learning models that can be trained using supervised learning techniques. As illustrated, model generator 140 includes a feature map generator 142, a category splitter 144, and a model retrainer 146.

Feature map generator 142 generally is configured to generate an initial machine learning model using a training data set of user-provided and tagged data in training data repository 150. In some embodiments, feature map generator 142 may pre-process the training data set to generate a balanced training data set such that each user-defined category includes a similar number of images for use in training the initial machine learning model (e.g., such that the difference between the number of images in a first user-defined category and the number of images in a second user-defined category is within a threshold amount). By pre-processing the training data set to generate the balanced training data set, feature map generator 142 can generate a training data set that does not bias classification towards a category that has significantly more images in the training data set than categories that have fewer images in the training data set. For example, given a training data set with 15,000 images in a first category and 3,000 images in a second category, images in the second category have a higher likelihood of being classified in the first category because of the unbalance in the training data set. Balancing the training data set so that there are a similar number of images in the first and second categories may avoid biasing a machine learning model towards one category of images or other data in the training data set.

After balancing the training data set, feature map generator trains an initial machine learning model. The initial machine learning model may be trained such that a feature map may be generated for each of a plurality of features identified in the images that may be used to determine whether an image is in a specific category. In some embodiments, where the machine learning model is a convolutional neural network or other type of neural network, each feature may correspond to a hidden layer of a neural network (i.e., a layer between an input layer of the machine learning model and an output layer of the machine learning model). To generate a feature map, feature map generator can perform an aggregation operation over a feature from a layer of a machine learning model. The aggregation operation may use, for example, k-nearest neighbor (kNN) techniques or other distance-based techniques to generate a feature map showing the locations, on the feature map, of each image in the training data set for a specific selected feature.

Feature map generator 142 generally passes the generated feature map to category splitter 144, which uses the feature map to identify user-defined categories that can be split into a plurality of sub-categories. Generally, category splitter 144 can identify a user-defined category that can be split into a plurality of sub-categories by identifying, in the feature map, areas in which images belonging to the user-defined category overlap with images belonging to a different user-defined category. In some embodiments, the images in the area of the generated feature map that overlaps with images belong to another user-defined category may be designated as a sub-category of images if these images are determined to be in a cluster that is a threshold distance away from the center or some other pre-defined point on the feature map for the user-define category of images.

When category splitter 144 identifies a user-defined category of images A that can be split into a plurality of sub-categories $\{A, A', A'', \ldots\}$, category splitter 144 can generate a new training data set of data from the training data set used by feature map generator 142 to generate the initial machine learning model. The user-defined category of images A may overlap with a single user-defined category of images B such that $\{A', A'', \ldots\}$ each overlap with a portion of the feature map including images from user-defined category B. The user-defined category of images A may, in some embodiments, overlap with multiple other user-defined categories of images $\{B, C, \ldots\}$ such that A' overlaps with the portion of the feature map including images from user-defined category B, A'' overlaps with the portion of the feature map including images from user-defined category C, and so on. In still further scenarios, a portion of the feature map including images from user-defined category of images A may overlap with a portion of the feature map including images from user-defined category of images B (designated the A-B overlapping area), and a portion of the feature map including images from user-defined category of images C may overlap with the A-B overlapping area. In such a scenario, each of user-defined categories A, B, and C may be split into sub-categories A and A', B and B', and C and C', respectively, and A', B', and C' may include images in the A-B overlapping area of the feature map from their respective parent user-defined categories.

The new training data set may include the plurality of sub-categories, with one of the sub-categories retaining the user-defined category name and the other sub-categories being designated with different names (e.g., with one or more characters prepended to the user-defined category name or appended to the user-defined category name). Images that are not in the area of the feature map overlapping with images from a second user-defined category may remain tagged with the user-defined category name. Category splitter 144 can rewrite the tags of images that are within an area of the feature map overlapping with images from a second user-defined category with a sub-category name that is different from the user-defined category name.

Further, after category splitter 144 determines that a user-defined category can be divided into a plurality of sub-categories, category splitter 144 may generate a mapping between each of the plurality of sub-categories and the user-defined category. The mapping may be generated, for example, in a mapping table or other lookup table that is provided to application server 130 with the retrained machine learning model generated by model retrainer 146, as discussed above. Generally, a mapping may include a listing of the categories of images or other data generated by category splitter 144 and the corresponding user-defined category for each category generated by category splitter 144.

In some embodiments, category splitter 144 can rebalance the new training data set prior to providing the new training data set to model retrainer 146 for use in retraining the machine learning model. Generally, as discussed above, rebalancing the new training data set may include reducing the size of the training data set such that each category of data in the new training data set includes a similar number of images. That is, for a new training data set {A, A', B, B', C}, where images in sub-categories A and A' belong to user-defined category A and images in sub-categories B and B' belong to user-defined category B, each of A, A', B, B', and C may have a similar number of images for use in retraining the model.

In some embodiments, category splitter 144 can determine that a sub-category of a first user-defined category overlaps with a sub-category of a second user-defined category in the training data set. That is, given a first user-defined category A and a second user-defined category B, sub-categories A' and B' overlap in the feature map. In some embodiments, where sub-categories A' and B' overlap in the feature map, category splitter 144 can determine that other features should be used to split categories of data based on an aggregated feature map. In some embodiments, other aggregation parameters may be used to determine whether to split a user-defined category into a plurality of sub-categories. For example, the aggregation parameters may be changed to use a different minimum and maximum number of neighbors in the aggregation, a different similarity metric, or the like. In some embodiments, features from a different layer in the machine learning model may be used in conjunction with the feature used to generate the feature map to generate a new feature map.

Model retrainer 146 uses the new training data set generated by category splitter 144 to retrain the machine learning model initially trained by feature map generator 142. Generally, by retraining the machine learning model using the new training data set generated by category splitter 144, model retrainer 146 may generate a machine learning model that is trained to categorize received images into one of a plurality of internal categories, which may include sub-categories of data generated from identifying overlapping areas in a feature map, as discussed above, and user-defined categories of data that do not include areas in the feature map that overlap with areas in the feature map associated with other categories.

In some embodiments, model retrainer 146 may additionally retrain a machine learning model based on new training data. To retrain a machine learning model based on new training data, model retrainer 146 can examine the feature on which category splitter 144 generated a feature map to identify the internal category to which the new training data belongs. Model retrainer 146 can further rebalance the training data set, augmented by the new training data, to ensure that the model is retrained on a training data set having substantially similar numbers of images in each internal category of images.

Training data store 150 generally is representative of a data store that can store a training data set used by model generator 140 to train a machine learning model for classifying images, as discussed above. Training data store 150 may be a relational database, a non-relational database, a flat file store, or other appropriate data store in which images and the associated user-defined category for each image can be stored.

Figure 2:
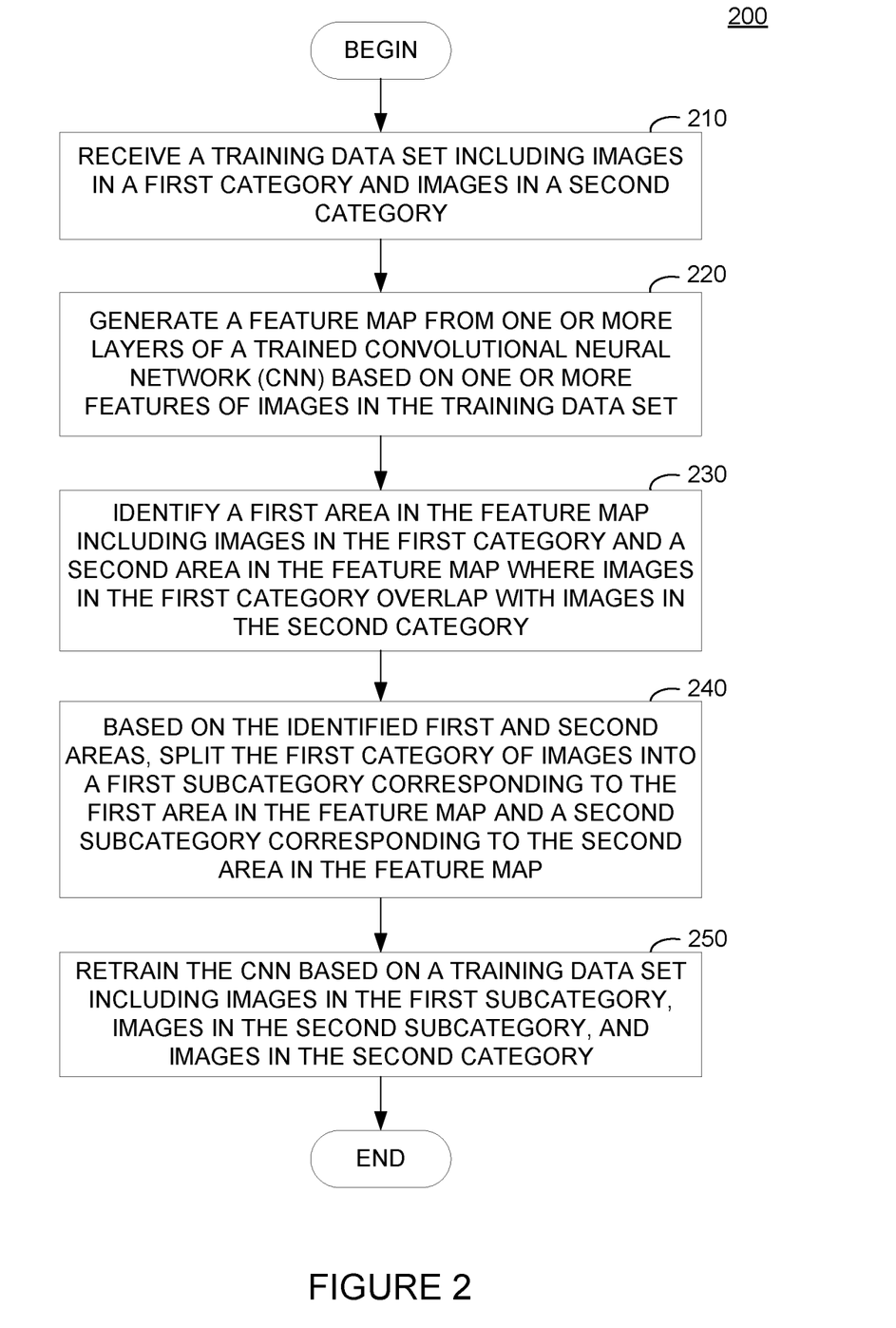
FIG. 2 illustrates example operations for training a machine learning model using a training data set of images from a first category of images that overlaps with images from a second category of images, according to one embodiment.

FIG. 2 illustrates example operations that may be performed by a system to train a machine learning model based on a training data set including images or other content in a first category that overlaps with images or other content in a second category, according to an embodiment.

As illustrated, operations 200 begin at block 210, where the system receives a training data set including images in a first category and images in a second category. As discussed, the training data set generally includes a plurality of images, and each image in the plurality of images may be labeled or otherwise associated with a user-defined category.

At block 220, the system generates a feature map from one or more layers of a trained convolutional neural network (CNN) based on one or more features of images in the training data set. To generate the feature map, the system may train an initial CNN based on the received training data set. The system may then select a first feature, associated with one of the layers of the initial CNN, on which to generate a feature map using aggregation methods, such as k-nearest neighbor. Generally, the feature map may be generated with a plurality of clusters, with each cluster in the feature map representing a grouping of similar images. In some cases, a cluster may include images belonging to a first user-defined category and images belonging to a second user-defined category.

At block 230, the system identifies a first area in the feature map including images in the first category and a second area in the feature map where images in the first category overlap with images in the second category. Generally, as discussed, the first area in the feature map may be an area representing images having features that do not overlap with features of images in a different user-defined category, while the second area may be an area in the feature map representing images having features that overlap with features of images in a different user-defined category. In some embodiments, the second area may be defined as an area of images belonging to a first category that is a threshold distance away from the first area in the feature map. In some embodiments, if the system determines that the second area in the feature map overlaps with a similar second area in the feature map for images belonging to the second user-defined category that is separate from a primary area in the feature map for images belonging to the second user-defined category, the system can identify a different feature to use for generating the feature maps, alone or in combination with the currently selected feature, and can adjust parameters used to aggregate the images into different areas of the feature map.

At block 240, based on the identified first and second areas, the system splits the first category of images into a first subcategory corresponding to the first area in the feature map and a second subcategory corresponding to the second area in the feature map. In splitting the first category of images into a first subcategory and a second subcategory, the system can generate a new training data set with images in the first area in the feature map retaining a tag specifying the corresponding user-defined category and images in the second area in the feature map being tagged with a different label. This different label may be derived from the user-defined category. Additionally, based on the label generated for the images in the second area, the system can generate a mapping between internal categories used in retraining the convolutional neural network (or other machine learning model) and the user-defined categories originally included in the training data set so that an output of an image classifier using the retrained convolutional neural network corresponds to one of the user-defined categories rather than an internal category.

At block 250, the system retrains the CNN based on a training data set including images in the first subcategory, images in the second subcategory, and images in the second user-defined category of images. By retraining the CNN based on a training data set including the images in the first subcategory, images in the second subcategory, and images in the second user-defined category of images, the CNN may be trained to classify a received image as being in the first subcategory, the second subcategory (i.e., the subcategory of images that are mapped to an area in the feature map overlapping with the area in the feature map to which images from the second user-defined category are mapped). A representation of the retrained CNN may be saved to one or more files that can be used by an application to execute the retrained CNN in a standalone application or may otherwise be deployed to an application server, such as application server 130 illustrated in FIG. 1, for execution.

Figure 3:
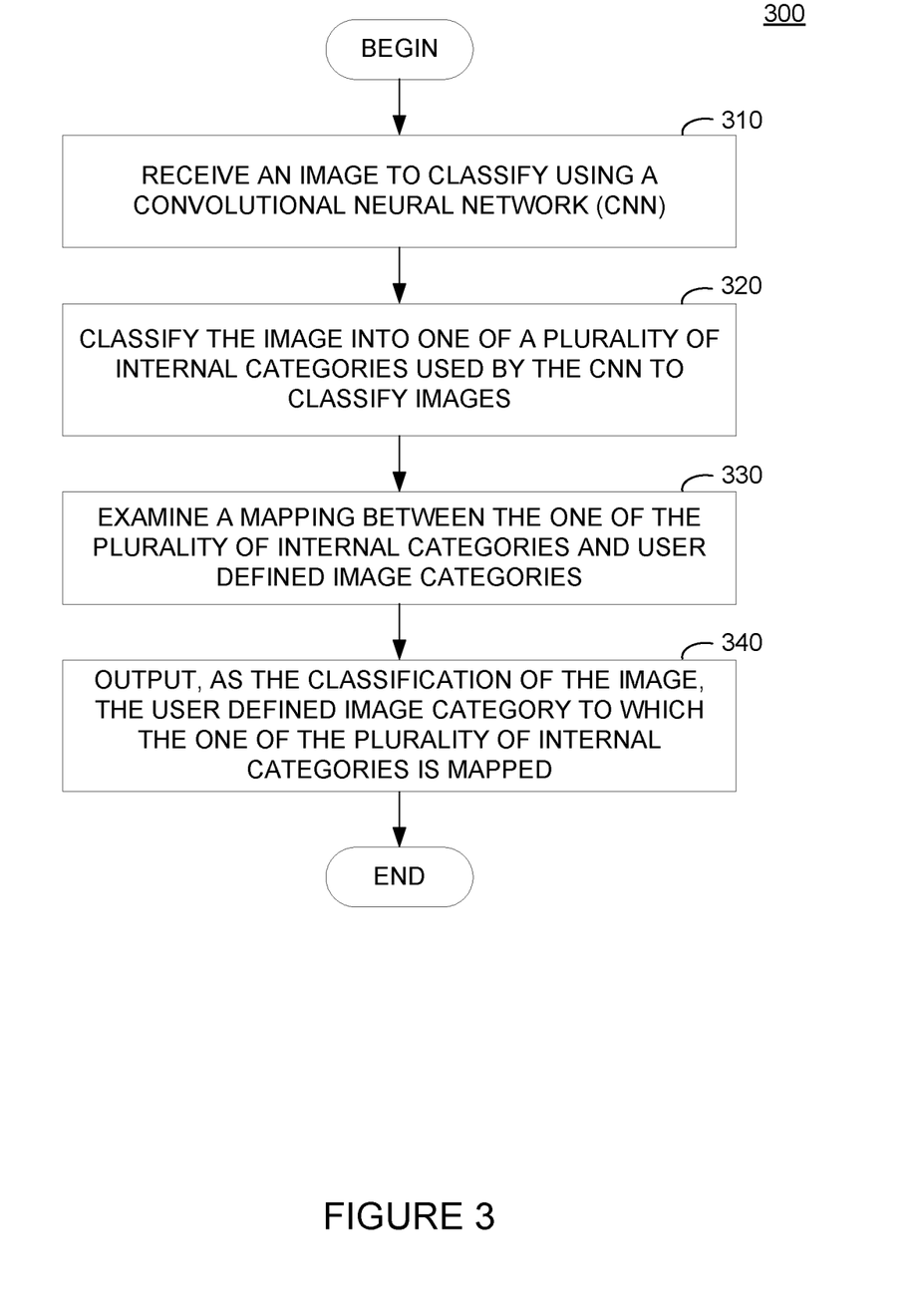
FIG. 3 illustrates example operations for classifying images using a machine learning model trained using a data set of images tagged with internal categories mapped to user-defined categories, according to one embodiment.

FIG. 3 illustrates example operations for classifying images using a machine learning model trained using a data set of images tagged with internal categories mapped to user-defined categories, according to an embodiment.

As illustrated, operations 300 begin at block 310, where a system receives an image to classify using a convolutional neural network (CNN). The image to classify may be received as a user upload from a client device as a single image or an image in a batch of images for analysis. In some embodiments, the image to classify may be received in real time from a client device, such as a monitoring computer or process controller in an industrial environment.

At block 320, the system classifies the image into one of a plurality of internal categories used by the CNN to classify images. The internal categories generally correspond to the categories with which images used to train the CNN are tagged. As discussed above, the internal categories may include subcategories generated from a feature map for images in a user-defined category and user-defined categories that are not split into subcategories.

At block 330, the system examines a mapping between the one of the plurality of internal categories to which the image is classified and the user-defined image categories. As discussed, the mapping may be included in a table generated during training of the CNN and may identify, for each internal category, the corresponding user-defined image category to which the internal category is mapped.

At block 340, the system outputs, as the classification of the image, the user-defined image category to which the one of the plurality of internal categories is mapped.

Figure 4:
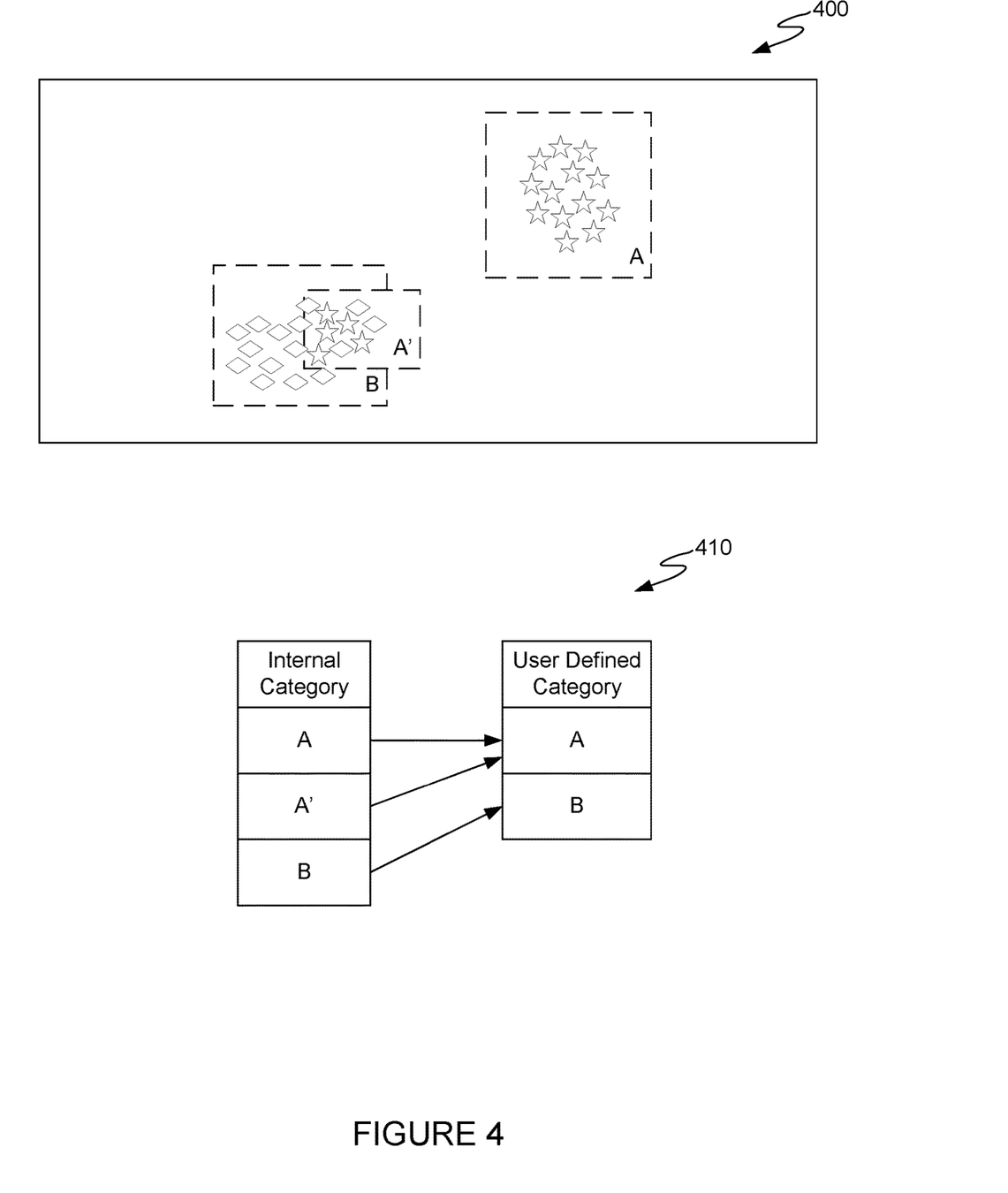
FIG. 4 illustrates an example feature map and associated mapping of convolutional neural network (CNN) categories to user-defined categories, according to one embodiment.

FIG. 4 illustrates an example feature map generated during training of a convolutional neural network and a mapping of internal categories generated from the feature map to user-defined categories, according to an embodiment.

As illustrated, feature map 400 includes a mapping of two user-defined categories of images. User-defined category A may be represented by the stars on the feature map 400, and user-defined category B may be represented by the diamonds on the feature map 400. Each item on the feature map 400 (e.g., each star or diamond) may be placed at a location on the feature map 400 based on a feature value for each image generated by the convolutional neural network. As discussed, the feature values may be placed on the map using various techniques, such as k-nearest neighbor or other aggregation techniques.

As illustrated, images in user-defined category A are mapped to two spaces in the feature map 400. A first space, designated as feature space A, corresponds to the images in user-defined category A that have features with values that do not overlap with the feature values for images in user-defined category B. A second space, designated as feature space A', corresponds to the images in user-defined category A that have features with values that overlap with the feature values for images in user-defined category B. Finally, as illustrated, the images in user-defined category B are mapped to an area in feature map 400 designated as feature space B.

Based on the identifying that some images in user-defined category A are mapped to the same area in feature space 400 as images in user-defined category B, a system can determine that user-defined category A should be split into two internal categories, A and A'. Internal category A generally corresponds to the images in feature space A, as illustrated in FIG. 4. Internal category A' generally corresponds to the images in feature space A', which, as discussed, partially overlaps with feature space B (i.e., the feature space to which images in user-defined category B are mapped).

Based on the determination that user-defined category A should be split into internal categories A and A', the system can generate a new training data set or edit the current training data set to assign a label corresponding to internal category A' to the images having features mapped to feature space A' in feature map 400. Additionally, the system can generate a map 410 between the internal categories generated by the system and used to retrain the convolutional neural network and the user-defined categories, which, as discussed, may be used after the convolutional neural network has categorized an image to one of the internal categories, to identify the user-defined category to which the image belongs.

Figure 5:
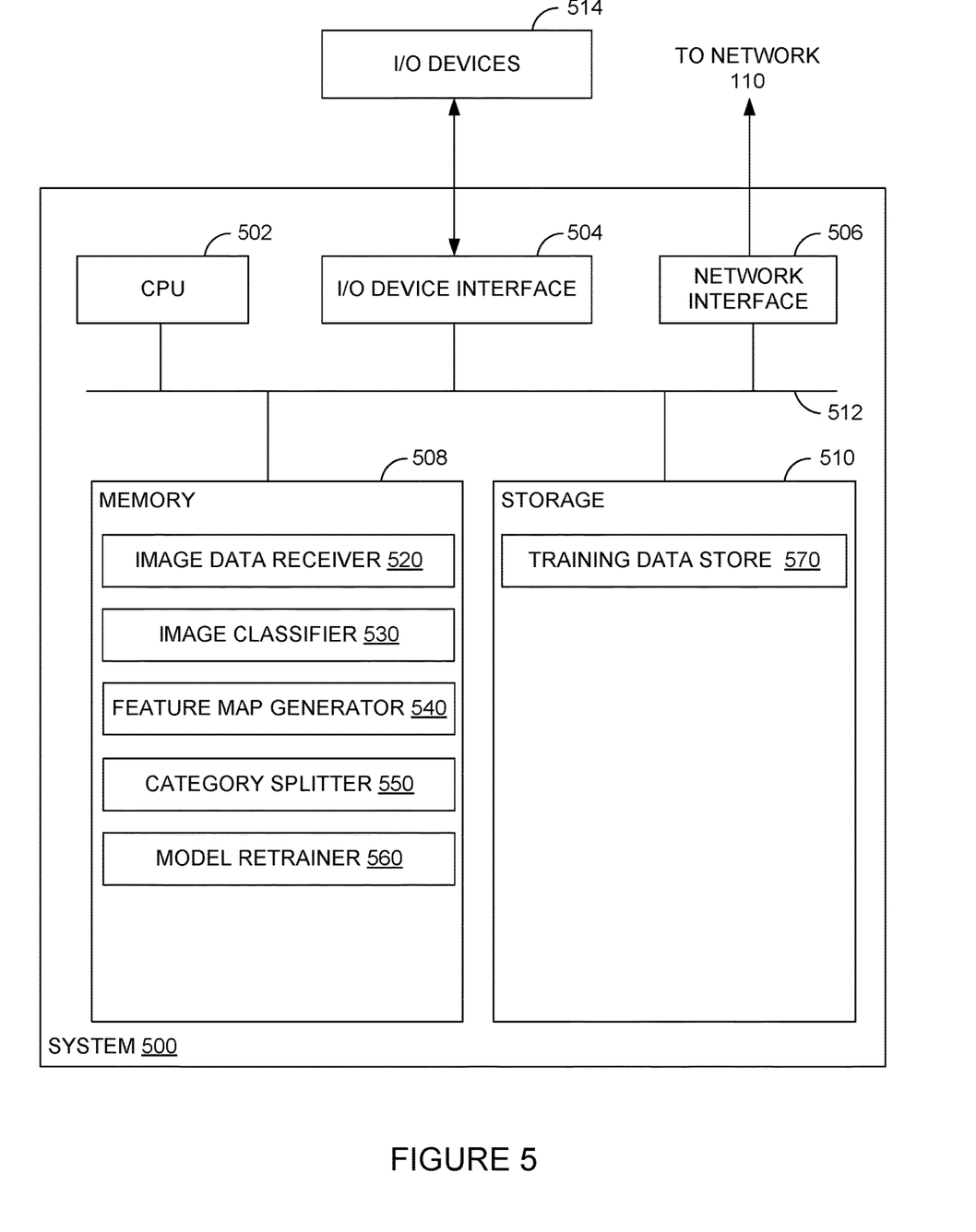
FIG. 5 illustrates an example system in which aspects of the present disclosure may be performed.

FIG. 5 illustrates an example application server 500 that trains a machine learning model (e.g., a convolutional neural network) to recognize images by splitting user-defined categories of images into internal categories based on a feature map generated for images in a training data set, according to an embodiment. As shown, application server 500 includes, without limitation, a central processing unit 502, one or more I/O device interfaces 504, which may allow for the connection of various I/O devices 514 (e.g., keyboards, displays, mouse devices, pen input, etc.) to the entity analytics system 500, network interface 506, a memory 508, storage 510, and an interconnect 512.

CPU 502 may retrieve and execute programming instructions stored in the memory 508. Similarly, the CPU 502 may retrieve and store application residing in the memory 508. The interconnect 512 transmits programming instructions and application data among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive. Although shown as a single unit, the storage 510 may be a combination of fixed and/or removable storage devices, such as fixed disc drives, solid state drives, removable memory cards or optical storage, network attached storage (NAS), or a storage area-network (SAN).

As illustrated, memory 508 includes an image data receiver 520, image classifier 530, feature map generator 540, category splitter 550, and model retrainer 560. Image data receiver 520 generally receives images from an external source (e.g., a client device) or a camera connected to system 500 via I/O interface 504 for analysis. Image data receiver 520 may be configured to perform one or more postprocessing operations on a received image prior to providing the image to image classifier 530 for classification.

Image classifier 530 uses a machine learning model trained using a training data set of images split into a plurality of internal categories to classify an image received from image data receiver 520. After classifying an image to one of a plurality of internal categories, image classifier 530 can use a map between the internal categories and user-defined categories to determine the user-defined category that an image should be classified in. Image classifier 530 may output the determined user-defined category, for example, for display in a graphical user interface on a display connected to system 500, to a remote system for display, or the like.

Feature map generator 540 generally receives or retrieves a training data set of images from a remote data source or training data store 570 in storage 110 and trains an initial machine learning model (e.g., a convolutional neural network) using the retrieved training data set. As discussed, the training data set may include a plurality of images categorized a priori to a plurality of categories. In some embodiments, feature map generator 540 can balance the number of images included in each user-defined category of images prior to training the initial machine learning model so that the initial machine learning model is not biased towards categorizing received images to the user-defined category having a disproportionately large number of images in the training data set. After training the initial machine learning model, feature map generator 540 generally selects at least a first feature in the machine learning model on which to generate a feature map and generates a feature map for the training data set of images.

Category splitter 550 uses the feature map generated by feature map generator 540 to determine whether a user-defined category of images should be split into a plurality of internal categories. Generally, a user-defined category of images may be split into a plurality of internal categories if a portion of the user-defined category of images is mapped to a first feature area in the feature map and a portion of the user-defined category of images is mapped to a second feature area in the feature map that overlaps with the feature area for a different user-defined category of images. When category splitter 550 determines that a user-defined category of images should be split, category splitter 550 can edit the labels associated with each image in the user-defined category so that images mapped to the second feature area of the feature map are labeled or tagged with a different internal categorization from the user-defined category that these images were originally labeled with.

Model retrainer 560 uses a training data set generated by category splitter 550 to generate a retrained machine learning model that classifies images or other data into one of a plurality of internal categories identified by category splitter 550. Once retrained, the machine learning model may be deployed to image classifier 530 for use in classifying images initially into one of the internal categories and subsequently into the appropriate user-defined category based on a mapping between the internal categories and the user-defined categories, as discussed above.

Storage 510, as illustrated, includes a training data store 570. Training data store 570 generally provides a storage repository in which images used to train and retrain a machine learning model may be stored. Each of the images stored in training data store 570 may be labeled with a user-defined category, and the images and associated labels may be used by feature map generator 540, category splitter 550, and model retrainer 560 to generate a machine learning model that classifies images into one of a plurality of internal categories, as discussed above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the Application 132 could execute on a computing system in the cloud and perform read requests on a database based on indices included in an index data table and/or perform write requests on a database and maintain entries in the index data table for low-frequency data. In such a case, the Application 132 could perform database transactions and store and maintain information in the index data tables at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for training a machine learning model to classify images, comprising:
   receiving a training data set including images in a first category and images in a second category;
   training a convolutional neural network (CNN) using the received training data set;
   generating a map based on an output of the CNN for a feature in images in the training data set, wherein the map comprises a representation of a feature space in which the feature for each of the images in the training data set is located;
   identifying a first area in the map including images in the first category and a second area in the map where images in the first category overlap with images in the second category;
   based on the identified first and second areas, splitting the first category of images into a first subcategory corresponding to the first area in the map and a second subcategory corresponding to the second area in the map; and
   retraining the CNN based at least in part on a training data set including images in the first subcategory, images in the second subcategory, and images in the second category, wherein retraining the CNN comprises:
      determining a number of images in each of the first subcategory, the second subcategory, and the second category; and
      balancing images in the first subcategory, the second subcategory and the second category such that a difference between the number of images in the first subcategory, the number of images in the second subcategory, and the second category is within a threshold amount.

2. The method of claim 1, further comprising:
   deploying the retrained CNN to an image classifier, wherein the image classifier is configured to:
   receive an image for classification;
   classify the image using the retrained CNN into one of a plurality of internal categories, the internal categories including at least the first subcategory, the second subcategory, and the second category;
   identify a category for the image based on a mapping between the plurality of internal categories and a plurality of categories; and
   return the identified category as the classification of the image.

3. The method of claim 1, further comprising:
   identifying a third area in the map where images in a third category overlap with images in the second subcategory; and
   generating a third subcategory corresponding to the third area in the feature map, wherein the CNN is retrained based further on images in the third subcategory and images in the third category.

4. The method of claim 1, wherein training the CNN using the received training data set comprises:
   determining a number of images in each of the first category and the second category; and
   balancing images in the first category and the second category such that a difference between the number of images in the first category and the second category is within a threshold amount.

5. The method of claim 1, wherein splitting the first category of images into the first subcategory and the second subcategory comprises:
   determining that the second area in the clustering map overlaps with an area in the map in which a subset of images in the second category are mapped, the area in the map in which the subset of images in the second category are mapped being a threshold distance away from an area in the map in which remaining images in the second category are mapped;
   selecting a second feature on which to generate the map; and
   splitting the first category of images into the first subcategory and the second subcategory based on the map generated for the selected second feature.

6. The method of claim 1, wherein splitting the first category of images into the first subcategory and the second subcategory comprises:
   determining that the second area in the map overlaps with an area in the map in which a subset of images in the second category are located, the area in the map in which the subset of images in the second category are mapped being a threshold distance away from an area in the map in which remaining images in the second category are mapped;
   modifying one or more aggregation parameters used to generate the feature map;
   regenerating the map based on the modified aggregation parameters; and
   splitting the first category of images into the first subcategory and the second subcategory based on the regenerated map.

7. The method of claim 1, further comprising:
   receiving a set of images to add to the training data set;
   classifying the received set of images into one of the first subcategory, the second subcategory, or the second category based on a value of the one or more features for each image in the received set of images to add to the training data set; and
   retraining the CNN based on the training data set and the received set of images to add to the training data set.

8. A system, comprising:
   a processor; and
   a memory having instructions stored thereon which, when executed by the processor, performs an operation for training a machine learning model to classify images, the operation comprising:
      receiving a training data set including images in a first category and images in a second category;
      training a convolutional neural network (CNN) using the received training data set;
      generating a map based on an output of the CNN for a feature in images in the training data set, wherein the map comprises a graphical map illustrating a location of the feature for each of the images in the training data set;

identifying a first area in the map including images in the first category and a second area in the map where images in the first category overlap with images in the second category;

based on the identified first and second areas, splitting the first category of images into a first subcategory corresponding to the first area in the clustering map and a second subcategory corresponding to the second area in the map; and retraining the CNN based at least in part on a training data set including images in the first subcategory, images in the second subcategory, and images in the second category, wherein retraining the CNN comprises:

determining a number of images in each of the first subcategory, the second subcategory, and the second category; and balancing images in the first subcategory, the second subcategory and the second category such that a difference between the number of images in the first subcategory, the number of images in the second subcategory, and the second category is within a threshold amount.

9. The system of claim 8, wherein the operation further comprises:

deploying the retrained CNN to an image classifier, wherein the image classifier is configured to:

receive an image for classification;

classify the image using the retrained CNN into one of a plurality of internal categories, the internal categories including at least the first subcategory, the second subcategory, and the second category;

identify a category for the image based on a mapping between the plurality of internal categories and a plurality of categories; and return the identified category as the classification of the image.

10. The system of claim 8, wherein the operation further comprises:

identifying a third area in the map where images in a third category overlap with images in the second subcategory; and generating a third subcategory corresponding to the third area in the feature map, wherein the CNN is retrained based further on images in the third subcategory and images in the third category.

11. The system of claim 8, wherein training the CNN using the received training data set comprises:

determining a number of images in each of the first category and the second category; and balancing images in the first category and the second category such that a difference between the number of images in the first category and the second category is within a threshold amount.

12. The system of claim 8, wherein splitting the first category of images into the first subcategory and the second subcategory comprises:

determining that the second area in the map overlaps with an area in the map in which a subset of images in the second category are mapped, the area in the map in which the subset of images in the second category are mapped being a threshold distance away from an area in the map in which remaining images in the second category are mapped;

selecting a second feature on which to generate a map; and splitting the first category of images into the first subcategory and the second subcategory based on the map generated for the selected second feature.

13. The system of claim 8, wherein splitting the first category of images into the first subcategory and the second subcategory comprises:

determining that the second area in the map overlaps with an area in the map in which a subset of images in the second category are located, the area in the map in which the subset of images in the second category are mapped being a threshold distance away from an area in the map in which remaining images in the second category are mapped;

modifying one or more aggregation parameters used to generate the map;

regenerating the map based on the modified aggregation parameters; and splitting the first category of images into the first subcategory and the second subcategory based on the regenerated map.

14. The system of claim 8, wherein the operation further comprises:

receiving a set of images to add to the training data set;

classifying the received set of images into one of the first subcategory, the second subcategory, or the second category based on a value of the one or more features for each image in the received set of images to add to the training data set; and retraining the CNN based on the training data set and the received set of images to add to the training data set.

15. A computer-readable storage medium having instructions stored thereon which, when executed by a processor, performs an operation for training a machine learning model to classify images, the operation comprising:

receiving a training data set including images in a first category and images in a second category;

training a convolutional neural network (CNN) using the received training data set;

generating a map based on an output of the CNN for a feature in images in the training data set, wherein the map comprises a graphical map illustrating a location of the feature for each of the images in the training data set;

identifying a first area in the map including images in the first category and a second area in the map where images in the first category overlap with images in the second category;

based on the identified first and second areas, splitting the first category of images into a first subcategory corresponding to the first area in the map and a second subcategory corresponding to the second area in the map; and retraining the CNN based at least in part on a training data set including images in the first subcategory, images in the second subcategory, and images in the second category, wherein retraining the CNN comprises:

determining a number of images in each of the first subcategory, the second subcategory, and the second category; and balancing images in the first subcategory, the second subcategory and the second category such that a difference between the number of images in the first subcategory, the number of images in the second subcategory, and the second category is within a threshold amount.

16. The computer-readable storage medium of claim 15, wherein the operation further comprises:

deploying the retrained CNN to an image classifier, wherein the image classifier is configured to:
receive an image for classification;
classify the image using the retrained CNN into one of a plurality of internal categories, the internal categories including at least the first subcategory, the second subcategory, and the second category;
identify a category for the image based on a mapping between the plurality of internal categories and a plurality of categories; and
return the identified category as the classification of the image.

17. The computer-readable storage medium of claim 15, wherein splitting the first category of images into the first subcategory and the second subcategory comprises:
determining that the second area in the map overlaps with an area in the map in which a subset of images in the second category are mapped, the area in the map in which the subset of images in the second category are mapped being a threshold distance away from an area in the map in which remaining images in the second category are mapped;
selecting a second feature on which to generate a map; and
splitting the first category of images into the first subcategory and the second subcategory based on the map generated for the selected second feature.

18. The computer-readable storage medium of claim 15, wherein the operation further comprises:
receiving a set of images to add to the training data set;
classifying the received set of images into one of the first subcategory, the second subcategory, or the second category based on a value of the one or more features for each image in the received set of images to add to the training data set; and
retraining the CNN based on the training data set and the received set of images to add to the training data set.

* * * * *